United States Patent
Sugawara

(10) Patent No.: US 9,683,087 B2
(45) Date of Patent: Jun. 20, 2017

(54) PRODUCTION METHOD FOR POROUS POLYIMIDE RESIN FILM, POROUS POLYIMIDE RESIN FILM, AND SEPARATOR EMPLOYING SAME

(71) Applicant: TOKYO OHKA KOGYO CO., LTD., Kawasaki-shi (JP)

(72) Inventor: Tsukasa Sugawara, Kawasaki (JP)

(73) Assignee: TOKYO OHKA KOGYO CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/909,716

(22) PCT Filed: Aug. 6, 2014

(86) PCT No.: PCT/JP2014/070769
§ 371 (c)(1),
(2) Date: Feb. 2, 2016

(87) PCT Pub. No.: WO2015/020101
PCT Pub. Date: Feb. 12, 2015

(65) Prior Publication Data
US 2016/0185932 A1 Jun. 30, 2016

(30) Foreign Application Priority Data

Aug. 8, 2013 (JP) .................................. 2013-165407
Mar. 31, 2014 (JP) .................................. 2014-073987

(51) Int. Cl.
*C08J 9/26* (2006.01)
*C08J 9/00* (2006.01)
(Continued)

(52) U.S. Cl.
CPC . *C08J 9/26* (2013.01); *C08J 5/18* (2013.01); *C08J 9/0066* (2013.01); *H01M 2/145* (2013.01);
(Continued)

(58) Field of Classification Search
CPC .......... C08G 2101/00; C08J 2201/0442; C08J 2379/08; C08J 9/26; C08L 79/08
(Continued)

(56) References Cited

U.S. PATENT DOCUMENTS 6,635,381 B2    10/2003  Spillman et al.
2015/0072219 A1  3/2015  Less et al.

FOREIGN PATENT DOCUMENTS

CN   102530843 A    7/2012
EP   2 128 193 A1  12/2009
(Continued)

OTHER PUBLICATIONS

Wang et al., Simple Method for Preparation of Porous Polyimide Film with an Ordered Surface Based on in Situ Self-Assembly of Polyamic Acid and Silica Microspheres, Langmuir, 2010, 26(23), 18357-18361.
(Continued)

*Primary Examiner* — Nicholas P D'Aniello
*Assistant Examiner* — Abibatu Ojo-Amoo
(74) *Attorney, Agent, or Firm* — Knobbe Martens Olson & Bear LLP

(57) ABSTRACT

A porous polyimide resin film having a high aperture ratio, and a method for producing a porous polyimide film. The method includes removing fine particles from a polyimide resin-fine particle composite film to obtain a porous polyimide resin film by either removing at least a part of a polyimide resin portion of the polyimide resin-fine particle composite film prior to removing the fine particles, or by removing at least a part of the porous polyimide resin film subsequent to removing the fine particles.

6 Claims, 7 Drawing Sheets

(51) Int. Cl.
*C08J 5/18* (2006.01)
*H01M 2/16* (2006.01)
*H01M 10/0525* (2010.01)
*H01M 2/14* (2006.01)

(52) U.S. Cl.
CPC ..... *H01M 2/1653* (2013.01); *H01M 10/0525* (2013.01); *C08J 2201/044* (2013.01); *C08J 2201/0442* (2013.01); *C08J 2207/00* (2013.01); *C08J 2379/08* (2013.01); *H01M 2/14* (2013.01); *H01M 2220/30* (2013.01)

(58) Field of Classification Search
USPC .......................................................... 429/321
See application file for complete search history.

(56) References Cited

FOREIGN PATENT DOCUMENTS

| | | |
|---|---|---|
| JP | H11-144697 | 5/1999 |
| JP | 2004-204119 | 7/2004 |
| JP | 2009-177071 A | 8/2009 |
| JP | 2010-195899 | 9/2010 |
| JP | 2010-537387 | 12/2010 |
| JP | 2011-111470 | 6/2011 |
| JP | 2012-107144 | 6/2012 |
| JP | 2013-109842 | 6/2013 |

OTHER PUBLICATIONS

Office Action in Korean Patent Application No. 2016-034711492, dated May 13, 2016.

Wang et al. Simple Method for Preparation of Porous Polyimide Film with an Ordered Surface Based on in Situ Self-Assembly of Polyamic Acid and Silica Microspheres, Langmuir, Nov. 10, 2010, 26(23), pp. 18357-18361.

Office Action in Japanese Patent Application No. 2015-530925, mailed Jul. 19, 2016.

Communication in European Patent Application No. 14835087.9, dated Apr. 12, 2016.

PRODUCTION METHOD FOR POROUS POLYIMIDE RESIN FILM, POROUS POLYIMIDE RESIN FILM, AND SEPARATOR EMPLOYING SAME

This application is the U.S. National Phase under 35 U.S.C. §371 of International Application PCT/JP2014/070769, filed Aug. 6, 2014, designating the U.S., and published in Japanese as WO 2015/020101 on Feb. 12, 2015, which claims priority to Japanese Patent Application No. 2013-165407, filed Aug. 8, 2013; and Japanese Patent Application No. 2014-073987 filed Mar. 31, 2014 the entire contents of which are incorporated herein by reference.

TECHNICAL FIELD

The present invention relates to a method for producing a porous polyimide resin film, a porous polyimide resin film, and a separator employing the film.

BACKGROUND ART

In recent years, because of a reduction in the size of portable electronic devices and the development of hybrid automobiles, electric automobiles, etc. for addressing environmental problems such as an increase in atmospheric pollution and carbon dioxide, secondary batteries having excellent characteristics, such as high efficiency, high output, high energy density, and light weight are needed. As such secondary batteries, various secondary batteries are being researched and developed.

A lithium battery, which is a kind of secondary battery, usually has a structure in which a space between a positive electrode (cathode) and a negative electrode (anode) is filled with a lithium salt, such as $LiPF_6$, dissolved in an electrolytic solution, for example, a non-aqueous organic solvent. Lithium transition metal oxide is used as the positive electrode, and lithium or carbon (graphite) is mainly used as the negative electrode. The electrolytic solution has good ionic conductivity and negligible electrical conductivity. During charging, lithium ions move from the positive electrode to the negative electrode, and during discharging, lithium ions move in the reverse direction.

The positive electrode and the negative electrode of the lithium battery are separated from each other with a separator of a porous polymer film and are formed into a structure preventing their direct electric contact. Accordingly, the separator for a secondary battery is required to have various characteristics, such as film thickness (thinness), mechanical strength, ionic conductance (during containing of an electrolytic solution), electric insulation, electrolytic solution resistance, electrolytic solution-retaining property, and wettability. As the separators for secondary batteries having these properties, microporous films made of polyolefins, such as polyethylene and polypropylene, are generally used. These microporous films have random pores at a porosity of about 35% to 40% and are widely used as separators for lithium secondary batteries having negative electrodes of carbon.

However, these conventionally known separators are known to deposit lithium metal on graphite negative electrodes due to repeated charge and discharge cycles. Furthermore, the repetition of charge and discharge of a battery is known to cause the growth of dendrite lithium, resulting in a short circuit of the battery and this problem needs to be solved (Patent Document 1). Separately, it has been tried to use a polyimide having a high heat-resistance and high safety in the separator (Patent Documents 2 and 3).

Patent Document 1: Japanese Unexamined Patent Application (Translation of PCT Application), Publication No. 2010-537387

Patent Document 2: Japanese Unexamined Patent Application, Publication No. 2011-111470

Patent Document 3: Japanese Unexamined Patent Application, Publication No. 2012-107144

DISCLOSURE OF THE INVENTION

Problems to be Solved by the Invention

However, there was a problem in that the pores formed on the conventional polyimide film did not necessarily have a sufficient aperture ratio and could hinder movement of lithium ions, leading to high internal resistance of the battery.

The present invention has been made in view of the above circumstances, and an object thereof is to provide a method for producing a porous polyimide resin film having a high aperture ratio.

Means for Solving the Problems

The present inventors have discovered that the aperture ratio of a porous polyimide resin film can be increased by removing at least a part of a polyimide resin portion prior to formation of pores or of the porous polyimide resin film subsequent to formation of pores.

A first aspect of the present invention relates to a method for producing a porous polyimide resin film comprising removing fine particles from a polyimide resin-fine particles composite film to thereby obtain a porous polyimide resin film, in which the method comprises either removing at least a part of a polyimide resin portion of the polyimide resin-fine particle composite film prior to removing the fine particles, or removing at least a part of the porous polyimide resin film subsequent to removing the fine particles.

A second aspect of the present invention relates to a porous polyimide resin film produced by the method according to the first aspect of the present invention.

A third aspect of the present invention relates to a separator composed of the porous polyimide resin film according to the second aspect of the present invention.

A fourth aspect of the present invention relates to a secondary battery comprising an electrolytic solution and the separator according to the third aspect of the present invention being disposed between a negative electrode and a positive electrode.

Effects of the Invention

According to the present invention, a porous polyimide resin film having a high aperture ratio can be produced.

PREFERRED MODE FOR CARRYING OUT THE INVENTION

Figure 1:
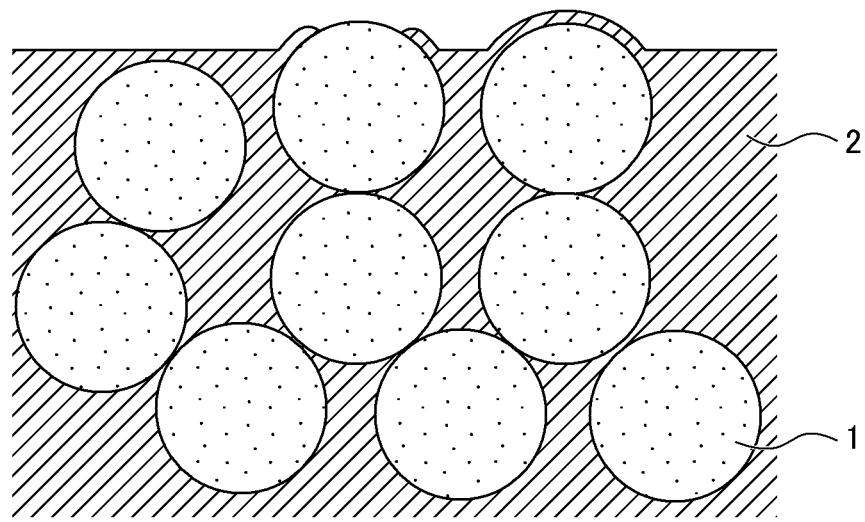
FIG. 1 is a diagram schematically illustrating a polyimide resin-fine particle composite film.

Embodiments of the present invention will now be described in detail, but the present invention is not limited to the following embodiments and can be implemented with appropriate modifications within the purpose of the present invention.

The method for producing a polyimide resin film, which is the first aspect of the present invention, comprises either removing at least a part of a polyimide resin portion of the polyimide resin-fine particle composite film prior to removing the fine particles, or removing at least a part of the porous polyimide resin film subsequent to removing the fine particles.

As a polyimide resin mentioned in the present Specification, polyimide or polyamide imide can be exemplified.

[Production of Varnish]

Varnish can be produced by mixing a polyamide acid or polyimide with an organic solvent in which fine particles are dispersed in advance at an appropriate ratio, or by polymerizing a tetracarboxylic dianhydride and a diamine into a polyamide acid in an organic solvent in which fine particles are dispersed in advance, or by further performing imidization into a polyimide. The final viscosity thereof is preferably adjusted to 300 to 1500 cP and more preferably in a range of 400 to 700 cP. The varnish having a viscosity within this range can be formed into a uniform film.

Resin fine particles and polyamide acid or polyimide or polyamide imide can be blended into the above described varnish such that a ratio of fine particles/polyimide resin is 1 to 3.5 (mass ratio) when a polyimide resin-fine particle composite film is obtained by calcination (if calcination is optional, drying), and the ratio of fine particles/polyimide resin is preferably 1.2 to 3 (mass ratio). Furthermore, the fine particles and the polyamide acid or polyimide or polyamide imide may be blended so as to provide the polyimide resin-fine particle composite film having a volume ratio of the fine particles/polyimide of 1.5 to 4.5. Moreover, the ratio of fine particles/polyimide resin of 1.8 to 3 (volume ratio) is more preferable. If a mass ratio or volume ratio of fine particles/polyimide is not lower than the lower limit, a film can have pores at an appropriate density as a separator; if the mass ratio or volume ratio is not higher than the upper limit, a film can be stably formed without causing problems such as an increase in viscosity or cracking in the film. It should be noted that values for percent by volume and volume ratios are values at 25° C.

<Fine Particles>

Material for the fine particles used in the present invention is not particularly limited, and can be any material that is insoluble in the organic solvent to be used in the varnishes and can be selectively removed after film formation. Examples of the inorganic material include metal oxides such as silica (silicon dioxide), titanium oxide, and alumina ($Al_2O_3$); examples of the organic materials include high-molecular-weight olefins (such as polypropylene and polyethylene) and organic polymer fine particles (resin fine particles) such as polystyrenes, acrylic resins (methyl methacrylate, isobutyl methacrylate, polymethyl methacrylate (PMMA), etc.), epoxy resins, celluloses, polyvinyl alcohols, polyvinyl butyrals, polyesters, and polyethers.

As preferable fine particles to be used for producing the porous polyimide resin film, among inorganic materials, silica such as colloidal silica can be exemplified. Among these, it is preferable to choose monodisperse spherical silica particles in order to form uniform and fine pores.

Resin fine particles used in the present invention can be selected from general linear polymers and known depolymerizable polymers, according to purpose without particular limitation. The linear polymer usually has a molecular chain that is randomly cleaved during thermal decomposition; and the depolymerizable polymer is decomposed into monomers during thermal decomposition. Both of them can be removed from the polyimide resin film by decomposing into monomers, a low molecular weight substance, or to $CO_2$ during heating. The resin fine particles to be used preferably have a decomposition temperature of 200° C. to 320° C. and more preferably 230° C. to 260° C. A decomposition temperature of 200° C. or higher allows formation of a film even if the varnish contains a high boiling point solvent, and broadens the selection of calcination conditions of the polyimide resin. In addition, a decomposition temperature of no higher than 320° C. allows the resin fine particles to disappear without thermally damaging the polyimide resin.

Among these depolymerizable polymers, homopolymers of methyl methacrylate or isobutyl methacrylate (polymethyl methacrylate or polyisobutyl methacrylate) having low thermal decomposition temperature, or copolymers composed mainly of this are preferred from the viewpoint of handleability during pore formation.

The fine particles to be used in the present invention preferably have a high sphericity and a low particle diameter distribution index. Fine particles satisfying these requirements show excellent dispersibility in the varnish and can be used without causing aggregation with one another. As the fine particles, those having a particle diameter (average diameter) of, for example, 100 to 2000 nm can be used. The fine particles satisfying these requirements are preferable for providing pores having uniform pore diameters in the porous film obtained by removing the fine particles and, especially when the film is used as a separator, homogenizing an electric field being applied.

In the production method described later, if a uncalcined composite film is to be formed as a two-layered uncalcined composite film, fine particles (B1) in the first varnish and fine particles (B2) in the second varnish may be either the same or different. In order to increase the density of the pores on the side in contact with the substrate to be higher than that on the other side, the fine particles (B1) preferably have a particle diameter distribution index lower than or equal to that of the fine particles (B2). Alternatively, the fine particles (B1) preferably have a sphericity lower than or equal to that of the fine particles (B2). In addition, the particle diameter (average diameter) of the fine particles (B1) is preferably smaller than that of the fine particles (B2). In particular, the fine particles (B1) preferably have a particle diameter of 100 to 1000 nm (more preferably 100 to 600 nm), and the fine particles (B2) preferably have a particle diameter of 500 to 2000 nm (more preferably 700 to 2000 nm). The use of the fine particles (B1 ) having a particle diameter smaller than that of the fine particles (B2) can give pores at a high aperture proportion with a small variation in the aperture proportion on the surface of the porous polyimide resin film being obtained, and can increase the strength of the film compared to the case of using fine particles having the same particle diameter as that of the fine particles (B1) in the entire porous polyimide resin film.

In the present invention, the varnish may further contain a dispersant in addition to the fine particles, in order to uniformly disperse the fine particles in the varnish. The addition of the dispersant allows further uniform mixing of the polyamide acid, polyimide, or polyamide imide with the fine particles and further uniform dispersion of the fine particles in the molded or formed precursor film. As a result, dense apertures are provided on the surface of the finally formed porous polyimide resin, and the front and rear surfaces can be efficiently interconnected with each other to improve the air permeability of the film.

The dispersant used in the present invention is not particularly limited and may be any known one. Examples of the dispersant include, but are not limited to, anionic surfactants such as salts of coconut fatty acid, salts of sulfonated castor oil, lauryl sulfate, polyoxyalkylene allylphenyl ether sulfate, alkylbenzenesulfonic acid, alkylbenzene sulfonate, alkyldiphenyl ether disulfonate, alkylnaphthalene sulfonate, dialkyl sulfosuccinate, isopropyl phosphate, polyoxyethylene alkyl ether phosphate, and polyoxyethylene allylphenyl ether phosphate; cationic surfactants such as oleylamine acetate, lauryl pyridinium chloride, cetyl pyridinium chloride, lauryl trimethylammonium chloride, stearyl trimethylammonium chloride, behenyl trimethylammonium chloride, and didecyl dimethylammonium chloride; amphoteric surfactants such as coconut alkyl dimethylamine oxide, fatty acid amide propyl dimethyl amine oxide, alkyl polyaminoethyl glycine hydrochloride, amide betaine surfactant, alanine surfactant, and lauryl iminodipropionic acid; polyoxyalkylene primary alkyl ether or polyoxyalkylene secondary alkyl ether nonionic surfactants such as polyoxyethylene octyl ether, polyoxyethylene decyl ether, polyoxyethylene lauryl ether, polyoxyethylene laurylamine, polyoxyethylene oleylamine, polyoxyethylene polystyryl phenyl ether, and polyoxyalkylene polystyryl phenyl ether; other polyoxyalkylene nonionic surfactants such as polyoxyethylene dilaurate, polyoxyethylene laurate, polyoxyethylenated castor oil, polyoxyethylenated hydrogenated castor oil, sorbitan laurate, polyoxyethylene sorbitan laurate, and fatty acid diethanolamide; fatty acid alkyl esters such as octyl stearate and trimethylolpropane tridecanoate; and polyether polyols such as polyoxyalkylene butyl ether, polyoxyalkylene oleyl ether, and trimethylol propane tris (polyoxyalkylene) ether. These dispersants may be used as a mixture of two or more thereof.

<Polyamide Acid>

As the polyamide acid used in the present invention, one obtained by polymerizing any tetracarboxylic dianhydride and diamine can be used without particular limitation. The amounts of the tetracarboxylic dianhydride and the diamine are not particularly limited, and the amount of the diamine is preferably 0.50 to 1.50 mol, more preferably 0.60 to 1.30 mol, and most preferably 0.70 to 1.20 mol, based on 1 mol of the tetracarboxylic dianhydride.

The tetracarboxylic dianhydride can be appropriately selected from tetracarboxylic dianhydrides that have been conventionally used as raw materials for synthesizing polyamide acids. The tetracarboxylic dianhydride may be an aromatic tetracarboxylic dianhydride or an aliphatic tetracarboxylic dianhydride, but from the viewpoint of the heat resistance of the resulting polyimide resin, an aromatic tetracarboxylic dianhydride is preferably used. The tetracarboxylic dianhydrides may be used in a combination of two or more thereof.

Preferred examples of the aromatic tetracarboxylic dianhydride include pyromellitic dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 3,3',4,4'-biphenyltetracarboxylic dianhydride, 2,3,3',4'-biphenyltetracarboxylic dianhydride, 2,2,6,6-biphenyltetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3, 3-hexafluoropropane dianhydride, 3,3',4,4'-benzophenonetetracarboxylic dianhydride, bis(3,4-dicarboxyphenyl)ether dianhydride, bis(2,3-dicarboxyphenyl)ether dianhydride, 2,2',3,3'-benzophenonetetracarboxylic dianhydride, 4,4-(p-phenylenedioxy)diphthalic dianhydride, 4,4-(m-phenylenedioxy)diphthalic dianhydride, 1,2,5,6-naphthalenetetracarboxylic dianhydride, 1,4,5,8-naphthalenetetracarboxylic dianhydride, 2,3,6,7-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 9,9-bisphthalic anhydride fluorene, and 3,3',4,4'-diphenylsulfonetetracarboxylic dianhydride. Examples of the aliphatic tetracarboxylic dianhydride include ethylenetetracarboxylic dianhydride, butanetetracarboxylic dianhydride, cyclopentanetetracarboxylic dianhydride, cyclohexanetetracarboxylic dianhydride, 1,2,4,5-cyclohexanetetracarboxylic dianhydride, and 1,2,3,4-cyclohexanetetracarboxylic dianhydride. Among these, 3,3',4,4'-biphenyl tetra carboxylic dianhydride is preferable from the viewpoint of price, availability, and the like. These tetracarboxylic dianhydrides may be used alone or as a mixture of two or more thereof.

The diamine can be appropriately selected from diamines that have been conventionally used as raw materials for synthesizing polyamide acids. The diamine can be either an aromatic diamine or an aliphatic diamine; however, an aromatic diamine is preferable from the viewpoint of heat resistance of the resulting polyimide resin. These diamines may be used in a combination of two or more thereof.

Examples of the aromatic diamine include diamino compounds having one phenyl group or about two to ten phenyl groups. Specifically, examples of the aromatic diamine include phenylenediamines and their derivatives, diaminobiphenyl compounds and their derivatives, diaminodiphenyl compounds and their derivatives, diaminotriphenyl compounds and their derivatives, diaminonaphthalenes and their derivatives, aminophenylaminoindanes and their derivatives, diaminotetraphenyl compounds and their derivatives, diaminohexaphenyl compounds and their derivatives, and cardo-type fluorenediamine derivatives.

The phenylenediamines are, for example, m-phenylenediamine and p-phenylenediamine. The phenylenediamine derivatives are diamines to which alkyl groups, such as a methyl group or an ethyl group, are bound, such as 2,4-diaminotoluene and 2,4-triphenylenediamine.

The diaminodiphenyl compounds are obtained by linkage of two aminophenyl groups at their phenyl groups. For example, the diaminodiphenyl compounds are 4,4'-diaminobiphenyl and 4,4'-diamino-2,2'-bis(trifluoromethyl)biphenyl.

Alternatively, the diaminodiphenyl compounds are obtained by linkage of two aminophenyl groups at their phenyl groups via another group. The linkage is, for example, an ether linkage, a sulfonyl linkage, a thioether linkage, a linkage of an alkylene or its derivative group, an imino linkage, an azo linkage, a phosphine oxide linkage, an amide linkage, or an ureylene linkage. The alkylene linkage is a linkage of an alkylene having about 1 to 6 carbon atoms, and its derivative group is an alkylene group whose one or more hydrogen atoms have been replaced by, for example, halogen atoms.

Examples of the diaminodiphenyl compounds include 3,3'-diaminodiphenyl ether, 3,4'-diaminodiphenyl ether, 4,4'-diaminodiphenyl ether, 3,3'-diaminodiphenyl sulfone, 3,4'-diaminodiphenyl sulfone, 4,4'-diaminodiphenyl sulfone, 3,3'-diaminodiphenyl methane, 3,4'-diaminodiphenyl methane, 4,4'-diaminodiphenyl methane, 4,4'-diaminodiphenyl sulfide, 3,3'-diaminodiphenyl ketone, 3,4'-diaminodiphenyl ketone, 2,2-bis(p-aminophenyl)propane, 2,2'-bis(p-aminophenyl) hexafluoropropane, 4-methyl-2,4-bis(p-aminophenyl)-1-pentene, 4-methyl-2,4-bis(p-aminophenyl)-2-pentene, iminodianiline, 4-methyl-2,4-bis(p-aminophenyl)pentane, bis(p-aminophenyl)phosphine oxide, 4,4'-diaminoazobenzene, 4,4'-diaminodiphenylurea, 4,4'-diaminodiphenylamide, 1,4-bis(4-aminophenoxy)benzene, 1,3-bis(4-aminophenoxy)benzene, 1,3-bis(3-aminophenoxy)benzene, 4,4'-bis(4-aminophenoxy)biphenyl, bis[4-(4-aminophenoxy)phenyl] sulfone, bis[4-(3-aminophenoxy)phenyl] sulfone, 2,2-bis[4-(4-aminophenoxy)phenyl] propane, and 2,2-bis[4-(4-aminophenoxy)phenyl]hexafluoropropane.

Among these, p-phenylenediamine, m-phenylenediamine, 2,4-diamino toluene, and 4,4'-diamino diphenyl ether are preferable from the viewpoint of price, availability, and the like.

The diaminotriphenyl compound is formed by linkage of two aminophenyl groups and one phenylene group, all of which are linked to each other through another group, the another group being selected from the same groups as in the diaminodiphenyl compounds. Examples of the diaminotriphenyl compounds include 1,3-bis(m-aminophenoxy)benzene, 1,3-bis(p-aminophenoxy)benzene, and 1,4-bis(p-aminophenoxy)benzene.

Examples of the diaminonaphthalenes include 1,5-diaminonaphthalene and 2,6-diaminonaphthalene.

Examples of the aminophenylaminoindanes include 5- or 6-amino-1-(p-aminophenyl)-1,3,3-trimethylindane.

Examples of the diaminotetraphenyl compounds include 4,4'-bis(p-aminophenoxy)biphenyl, 2,2'-bis[p-(p'-aminophenoxy)phenyl]propane, 2,2'-bis[p-(p'-aminophenoxy)biphenyl]propane, and 2,2'-bis[p-(m-aminophenoxy)phenyl] benzophenone.

Examples of the cardo-type fluorenediamine derivatives include 9,9-bisanilinefluorene.

The aliphatic diamine has, for example, about 2 to 15 carbon atoms, and specifically, examples thereof include pentamethylenediamine, hexamethylenediamine, and heptamethylenediamine.

The aliphatic diamine may be a compound having at least one substituent selected from the group consisting of halogen atoms and methyl, methoxy, cyano, and phenyl groups for hydrogen atoms of the diamine.

The polyamide acid to be used in the present invention may be produced by any method without particular limitation, and can be produced by a known method, for example by reaction of an acid with a diamine component in organic solvent.

The reaction of a tetracarboxylic dianhydride and a diamine is usually performed in an organic solvent. The organic solvent to be used for the reaction of a tetracarboxylic dianhydride and a diamine may be any organic solvent that can dissolve the tetracarboxylic dianhydride and the diamine without reacting with the tetracarboxylic dianhydride and the diamine. The organic solvent may be a single solvent or a mixture of two or more solvents.

Examples of the organic solvent used for reaction of tetracarboxylic dianhydride with diamine include: nitrogen-containing polar solvents such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea; lactone-based polar solvents such as β-propiolactone, γ-butyrolactone, γ-valerolactone, δ-valerolactone, γ-caprolactone and ε-caprolactone; dimethylsulfoxide; acetonitrile; fatty acid esters such as ethyl lactate and butyl lactate; ethers such as diethyleneglycol dimethylether, diethyleneglycol diethylether, dioxane, tetrahydrofuran, methyl cellosolve acetate and ethyl cellosolve acetate; and phenol solvents such as cresols. These organic solvents may be used alone or as a mixture of two or more thereof. Among these, a combination of the nitrogen-containing polar solvent with the lactone-based polar solvent is preferable. The amount of the organic solvent is not particularly limited but is desirably such an amount that the content of the resulting polyamide acid is 5% to 50% by mass.

Among these organic solvents, from the viewpoint of the solubility of the resulting polyamide acid, preferred are nitrogen-containing polar solvents, such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea. Alternatively, from the viewpoint of film forming property and the like, the organic solvent can be a blended solvent comprising lactone-based polar solvent such as γ-butyrolactone, which is preferably 1 to 20% by mass and more preferably 5 to 15% by mass with respect to the entire amount of organic solvent.

The polymerization temperature is usually −10° C. to 120° C. and preferably 5° C. to 30° C. The polymerization time varies depending on the raw material composition and is usually 3 to 24 hours (hr). The polyamide acid solution prepared under such conditions preferably has an intrinsic viscosity of 1000 to 100000 centipoises (cP), more preferably in a range of 5000 to 70000 cP.

<Polyimide>

The polyimide used in the present invention can be any known polyimide, without restriction by its structure and molecular weight, as long as the polyimide is soluble in the organic solvent to be used in the varnish according to the present invention. The side chain of the polyimide may have a condensable functional group, such as a carboxy group, or a functional group enhancing the cross-linking reaction during calcination.

In order to make the polyimide soluble in an organic solvent, it is effective to use a monomer for introducing a flexible bend structure into the main chain, for example, to use an aliphatic diamine, such as ethylenediamine, hexamethylenediamine, 1,4-diaminocyclohexane, 1,3-diaminocyclohexane, or 4,4'-diaminodicyclohexylmethane; an aromatic diamine, such as 2-methyl-1,4-phenylenediamine, o-tolidine, m-tolidine, 3,3'-dimethoxybenzidine, or 4,4'-diaminobenzanilide; a polyoxyalkylenediamine, such as polyoxyethylenediamine, polyoxypropylenediamine, or polyoxybutyrenediamine; a polysiloxanediamine; 2,3,3',4'-oxydiphthalic anhydride, 3,4,3',4'-oxydiphthalic anhydride, or 2,2-bis(4-hydroxyphenyl)propanedibenzoate-3,3',4,4'-tetracarboxylic dianhydride. It is also effective to use a monomer containing a functional group for improving the solubility in an organic solvent, for example, to use a fluorinated diamine, such as 2,2'-bis(trifluoromethyl)-4,4'-diaminobiphenyl or 2-trifluoromethyl-1,4-phenylenediamine. Furthermore, in addition to the monomer for improving the solubility of the polyimide, a monomer that is mentioned in the paragraph describing the polyamide acid may be used within a range that does not inhibit the solubility.

The polyimide soluble in an organic solvent to be used in the present invention may be produced by any method and, for example, can be produced by a known method of, for example, chemically imidizing or thermally imidizing a polyamide acid and dissolving the imidized polyamide in an organic solvent. Examples of such polyimides include aliphatic polyimide (full-aliphatic polyimides) and aromatic polyimides, and aromatic polyimides are preferred. The aromatic polyimide may be one prepared by a thermal or chemical ring-closing reaction of a polyamide acid having repeating units represented by Formula (1) or one prepared by dissolving a polyimide having repeating units represented by Formula (2) in a solvent. In the formulae, Ar represents an aryl group.

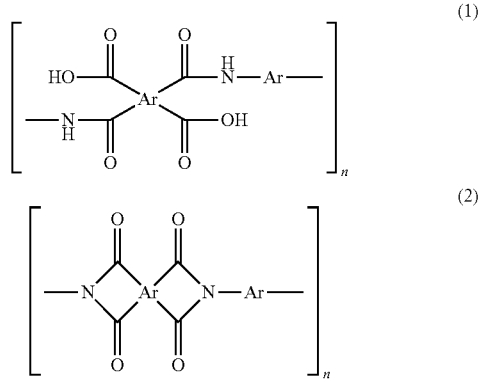

<Polyamide Imide>

The polyamide imide used in the present invention can be any known polyamide imide, without restriction by its structure and molecular weight, as long as the polyamide imide is soluble in the organic solvent to be used in the varnish according to the present invention. The side chain of the polyamide imide may have a condensable functional group, such as a carboxy group, or a functional group enhancing a cross-linking reaction etc. during calcination.

In addition, as the polyamide imide used in the present invention, polyamide imide obtained by reacting any trimellitic anhydride with diisocyanate, and polyamide imide obtained by imidizing a precursor polymer obtained as a result of reaction of a reactive derivative of any trimellitic anhydride with diamine can be used without particular limitation.

As the above mentioned any trimellitic anhydride or reactive derivative thereof, for example: trimellitic anhydride; trimellitic anhydride halides such as trimellitic anhydride chloride; trimellitic anhydride esters; and the like can be exemplified.

As the above mentioned any diisocyanate, for example, meta-phenylene diisocyanate, p-phenylene diisocyanate, o-tolidine diisocyanate, p-phenylene diisocyanate, m-phenylene diisocyanate, 4,4'-oxybis (phenyl isocyanate), 4,4'-diphenylmethane diisocyanate, bis[4-(4-isocyanate phenoxy) phenyl] sulfone, 2,2'-bis[4-(4-isocyanate phenoxy) phenyl] propane, 2,4-tolylene diisocyanate, 2,6-tolylene diisocyanate, 4,4'-diphenylmethane diisocyanate, 3,3'-dimethyldiphenyl-4,4'-diisocyanate, 3,3'-diethyldiphenyl-4,4'-diisocyanate, isophorone diisocyanate, hexamethylene diisocyanate, 4,4'-dicyclohexyl methane diisocyanate, m-xylene diisocyanate, p-xylene diisocyanate, naphtalen diisocyanate, and the like can be exemplified.

As the above mentioned any diamine, those exemplified above in the description with regard to the polyamide acid can be exemplified.

<Organic Solvent>

The organic solvent used in the varnish is not particularly limited as long as the solvent can dissolve a resin composed of polyamide acid and/or polyimide while not dissolving the fine particles; and can include those exemplified as the solvent used for reaction of tetracarboxylic dianhydride with diamine. The solvent can be used alone or in a combination of two or more types.

The content of the blended solvent (S) in all components of the varnish is preferably 50 to 95% by mass, and more preferably 60 to 85% by mass. The solid content concentration of the varnish is preferably 5 to 50% by mass, and more preferably 15 to 40% by mass.

In the production method described later, if an uncalcined composite film is to be formed as a two-layered uncalcined composite film, a volume ratio of polyamide acid, polyimide or polyamide imide (A1) to the fine particles (B1) in the first varnish is preferably 19:81 to 45:65. If the volume of the fine particles is at least 65 with respect to the total volume of the varnish being 100, the particles are uniformly dispersed; and if the volume is 81 or less, the particles are dispersed without causing aggregation with one another, allowing uniform formation of pores on the surface of the polyimide resin film on the substrate side. In addition, a volume ratio of polyamide acid, polyimide or polyamide imide (A2) to the fine particles (B2) in the second varnish is preferably 20:80 to 50:50. If the volume of the fine particles is at least 50 with respect to the total volume being 100, the particles themselves are uniformly dispersed; and if the volume is 80 or less, the particles are not aggregated and no cracking is caused on the surface, resulting in stable formation of a porous polyimide resin film having superior electrical characteristics.

As to the above described volume ratio, it is preferable that the second varnish is lower in the fine particle content than the first varnish; by satisfying this condition, even if the polyamide acid, polyimide or polyamide imide contains a large amount of fine particles, the strength and flexibility of the uncalcined composite film, the polyimide resin-fine particle composite film, and the porous polyimide resin film can be secured. In addition, the lower content ratio of the fine particles in the layer can reduce the cost of producing the film.

In addition to the above mentioned components, known components such as an antistatic agent, a fire retardant, a chemical imidizing agent, a condensation agent, a release agent, a superficial regulator, etc. can be added as necessary for static prevention, fire resistance, releasability, applicability, etc.

[Production of Unburned Composite Film]

The uncalcined composite film containing polyamide acid or polyimide resin as well as the fine particles is formed by: applying the above described varnish onto a substrate; and drying under ordinary pressure or under vacuum at 50 to 100° C. (preferably at 0 to 50° C.), more preferably under ordinary pressure at 60 to 95° C. (further preferably at 65 to 90° C.). A releasing layer can also be provided on the substrate.

The releasing layer can be provided by applying a releasing agent onto the substrate and drying or baking. The releasing agent used here may be a known releasing agent, such as an alkylphosphate ammonium salt-based or fluorine-based agent or silicon, without particular restriction. Upon peeling of the dried uncalcined composite film containing polyamide acid or polyimide resin as well as the fine particles from the substrate, a slight amount of the releasing agent remains on the peeled surface of the uncalcined composite film. The releasing agent thus remaining would have substantial adverse effects on wettability and electrical characteristics of the film surface, and is therefore preferably removed.

Accordingly, the uncalcined composite film peeled from the substrate is preferably washed with an organic solvent and the like. The washing method can be selected from known methods, such as a method in which the film is immersed in a washing solution and is then taken out, a method of shower washing, and the like. Furthermore, in order to dry the uncalcined composite film thus washed, known methods such as air drying at ambient temperature, heating in a thermostatic bath up to an appropriate temperature, and the like can be applied without limitation to the uncalcined composite film thus washed. For example, a method of fixing ends of the uncalcined composite film to a frame or the like made of stainless steel to thereby prevent deformation can be employed.

Alternatively, when a substrate is directly used without being provided with a releasing layer in formation of the uncalcined composite film, the steps of forming the releasing layer and washing the uncalcined composite film can be omitted.

Alternatively, in a case of forming a two-layered uncalcined composite film, a first uncalcined composite film of 1 to 5 μm in thickness is formed by: applying the above described first varnish onto a substrate as is; and drying under ordinary pressure or under vacuum at 0 to 100° C. (preferably at 0 to 90° C.), more preferably under ordinary pressure at 10 to 100° C. (further preferably at 10 to 90° C.)

Subsequently, a second uncalcined composite film of 5 to 30 μm in thickness is formed by: applying the above described second varnish onto the first uncalcined composite film thus formed; and drying similarly at 0 to 80° C. (preferably at 0 to 50° C.), more preferably under ordinary pressure at 10 to 80° C. (further preferably at 10 to 30° C.) to thereby obtain the two-layered uncalcined composite film.

[Production of Polyimide Resin-Fine Particle Composite Film (Calcining Step)]

The above described uncalcined composite film (or the two-layered uncalcined composite film, the same applies hereafter) after drying can be subjected to post-treatment by heating (calcination) to obtain a composite film (polyimide resin-fine particle composite film) composed of the polyimide resin and the fine particles. In a case in which the varnish contains polyamide acid, imidization is preferably completed in the calcining step. It should be noted that the calcining step is optional. Especially in a case in which polyamide or polyamide imide is used in the varnish, the calcining step can be omitted.

The calcination temperature varies depending on the structure of polyamide acid or polyimide resin contained in the uncalcined composite film and the presence or absence of a condensing agent, and is preferably 120° C. to 375° C. and more preferably 150° C. to 350° C.

Calcination is not necessarily clearly separated from the drying step, and in a case of calcining at 375° C., for example, a method of increasing the temperature from room temperature to 375° C. over 3 hours and then holding at 375° C. for 20 minutes; or a stepwise drying-thermal imidization method of increasing the temperature stepwise by 50° C. from room temperature to 375° C. (holding the temperature of each step for 20 minutes) and finally holding at 375° C. for 20 minutes. Here, a method of fixing ends of the uncalcined composite film to a frame or the like made of stainless steel to thereby prevent deformation can be employed.

The thickness of the resulting polyimide resin-fine particle composite film can be determined by, for example, measuring the thicknesses of a plurality of positions by a micrometer or the like and averaging the thicknesses. Preferred average film thickness varies depending on the purpose of the polyimide resin-fine particle composite film or the porous polyimide resin film, however, film thickness can be at least 1 μm, preferably 5 to 500 μm, and more preferably 10 to 100 μm, in the use as a separator for example. [Fine particle removing step (Porosification of polyimide resin-fine particle composite film)]

The porous polyimide resin film can be produced with high reproducibility by selecting an appropriate method for removing the fine particles from the polyimide resin-fine particle composite film. For example, in a case of employing silica as the fine particles, the polyimide-fine particle composite film can be made porous by dissolving and removing the silica with a low-concentration hydrogen fluoride solution (HF). In addition, in a case in which the fine particles are resin fine particles, the resin fine particles can be decomposed and removed by heating at a temperature equal to or greater than the above specified thermal decomposition temperature of the resin fine particles and lower than the thermal decomposition temperature of the polyimide resin. [Polyimide Resin Removing Step]

The method for producing a polyimide resin film of the present invention comprises a polyimide resin removing step of either removing at least a part of a polyimide resin portion of the polyimide resin-fine particle composite film prior to the fine particle removing step, or removing at least a part of the porous polyimide resin film subsequent to the fine particle removing step.

First, a polyimide resin removing step of removing at least a part of a polyimide resin portion of the polyimide resin-fine particle composite film prior to the fine particle removing step is described.

FIG. 1 is a diagram schematically illustrating a polyimide resin-fine particle composite film. Fine particles 1 are dispersed in a polyimide resin portion 2 to thereby form the polyimide resin-fine particle composite film. In the vicinity of a surface of the polyimide resin-fine particle composite film, the polyimide resin portion 2 covers a part of or entire fine particles 1. It should be noted that, since FIG. 1 is a schematic diagram, the fine particles 1 are illustrated in substantially the same diameter; however, the present invention is not limited thereto and the particle diameters of the fine particles 1 can have a distribution.

Figure 2:
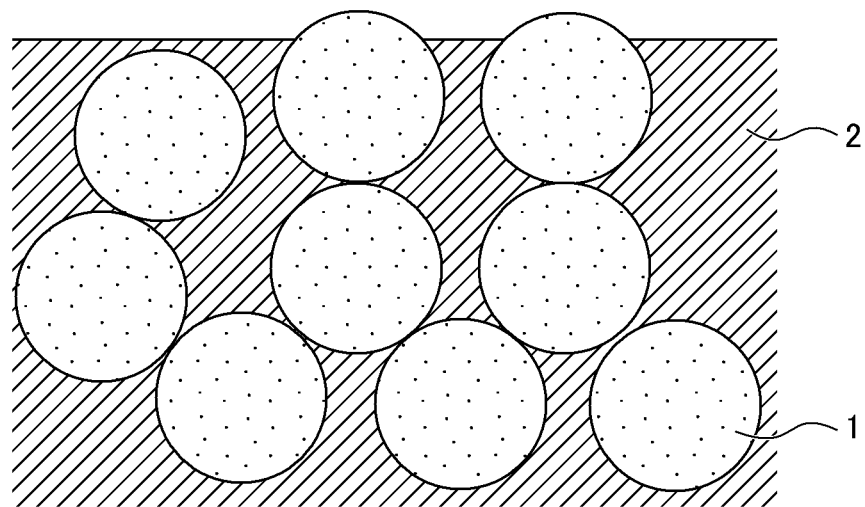
FIG. 2 is a diagram schematically illustrating an example in which a part of a polyimide resin portion of the polyimide resin-fine particle composite film has been removed.
Figure 3:
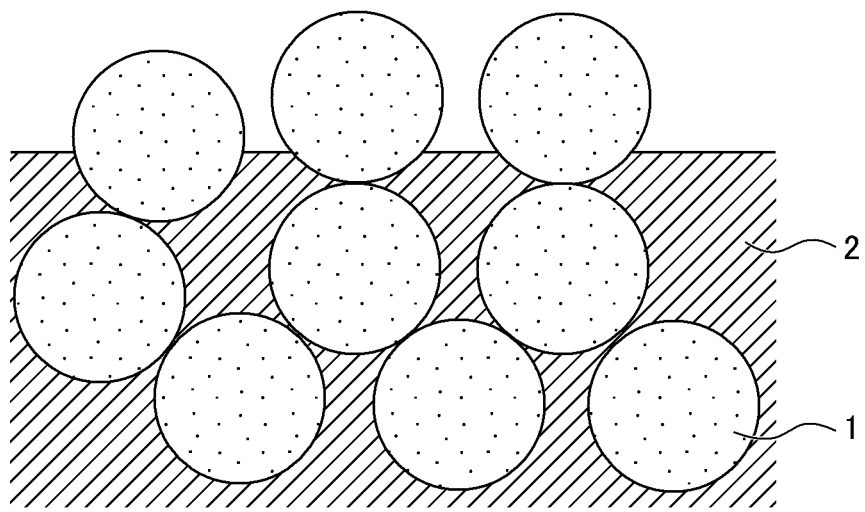
FIG. 3 is a diagram schematically illustrating an example in which a part of a polyimide resin portion of the polyimide resin-fine particle composite film has been removed.

The above mentioned "removing at least a part of a polyimide resin portion prior to the fine particles removing step" means removing any part of the polyimide resin portion 2 in FIG. 1. This means, for example, making configuration as in FIG. 2 or FIG. 3; however, the present invention is not limited thereto. FIG. 2 illustrates a case in which a relatively small amount of polyimide resin portion is removed; and FIG. 3 illustrates a case in which a larger amount of polyimide resin portion is removed. In the polyimide resin removing step, the fine particles can also be partially removed.

By removing a part of the polyimide resin portion 2, when the fine particles are removed and pores are formed in the subsequent fine particles removing step, the aperture ratio of the porous polyimide resin film as a final product can be increased, compared to a case of not removing the polyimide resin portion.

Next, a polyimide resin removing step of removing at least a part of the porous polyimide resin film subsequent to the fine particle removing step is described.

Figure 4:
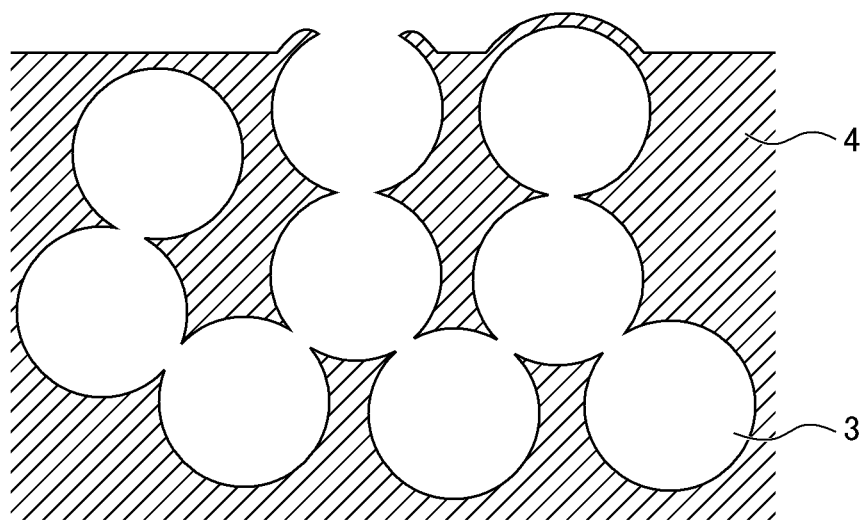
FIG. 4 is a diagram schematically illustrating a porous polyimide resin film prior to a polyimide resin removing step.

FIG. 4 is a diagram schematically illustrating the porous polyimide resin film immediately after the fine particle removing step. Pores 3 formed by disappearance of the fine particles are distributed in the porous polyimide resin film 4. Similarly to FIG. 1, since FIG. 4 is a schematic diagram, the pores 3 are illustrated in substantially the same diameter; however, the present invention is not limited thereto and the diameters of the pores 3 can have a distribution.

Figure 5:
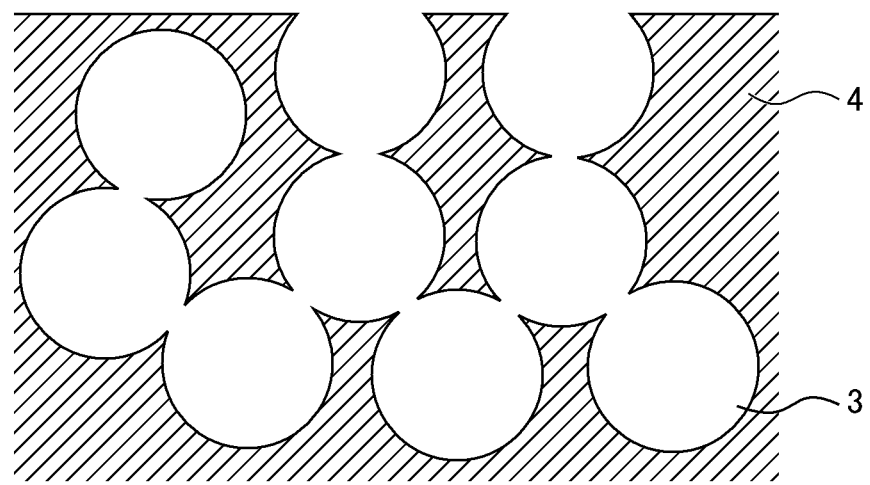
FIG. 5 is a diagram schematically illustrating an example in which a part of the porous polyimide resin film has been removed.
Figure 6:
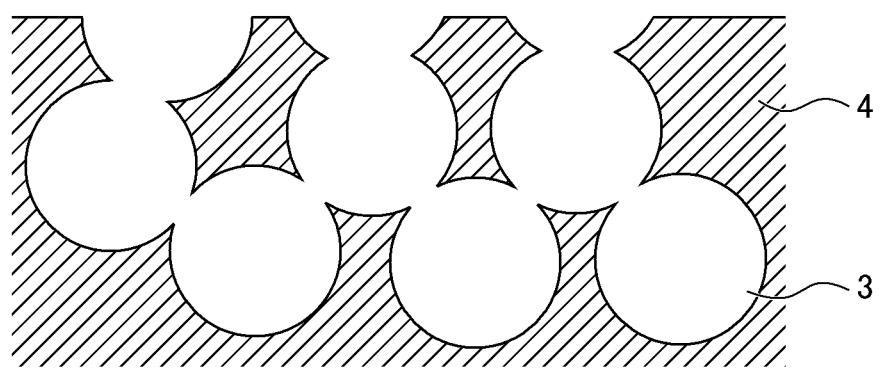
FIG. 6 is a diagram schematically illustrating an example in which a part of the porous polyimide resin film has been removed.

"Removing at least a part of the porous polyimide resin film subsequent to the fine particles removing step" means removing any part of the porous polyimide resin film 4 in FIG. 4. This means, for example, making configuration as in FIG. 5 or FIG. 6; however, the present invention is not limited thereto. FIG. 5 illustrates a case in which a relatively small amount of porous polyimide resin film is removed; and FIG. 6 illustrates a case in which a larger amount of porous polyimide resin film is removed. Alternatively, the pores can be made so as to interconnect with each other, by removing the porous polyimide resin film between adjacent pores.

By removing a part of the porous polyimide resin film, the aperture ratio of the porous polyimide resin film as a final product can be increased, compared to a case of not removing.

The above mentioned step of removing at least a part of the polyimide resin portion, or the step of removing at least a part of the porous polyimide resin film can be performed by a normal chemical etching method, physical removal method, or a combination thereof.

As the chemical etching method, a treatment with chemical etching solution such as inorganic alkali solution or organic alkali solution can be exemplified. The inorganic alkali solution is preferable. As the inorganic alkali solution: hydrazine solution containing hydrazine hydrate and ethylenediamine; solution of alkali metal hydroxides such as potassium hydroxide, sodium hydroxide, sodium carbonate, sodium silicate, sodium metasilicate; ammonia solution; etching solution composed primarily of hydroxylation alkali, hydrazine and 1,3-dimethyl-2-imidazolidinone can be exemplified. As the organic alkali solution: primary amines such as ethylamine and n-propylamine; secondary amines such as diethylamine and di-n-butylamine; tertiary amines such as triethylamine and methyldiethylamine; alcohol amines such as dimethylethanolamine and triethanolamine; quaternary ammonium salts such as tetramethylammonium hydroxide and tetraethylammonium hydroxide; and alkaline solution of cyclic amines such as pyrrol and piperidine, can be exemplified.

Pure water and alcohols can be selected as appropriate as a solvent for the above mentioned solutions. A solution with an appropriate amount of surfactant can also be used. Alkali concentration is for example 0.01 to 20% by mass.

As the physical method, for example: dry etching by plasma (oxygen, argon, etc.), corona discharge and the like; and a method of dispersing abrasives (e.g., alumina (hardness 9)) in liquid and spraying onto a surface of the polyimide resin-fine particle composite film or the porous polyimide resin film at a rate of 30 to 100 m/s to treat the surface of the polyimide resin-fine particle composite film or the porous polyimide resin film can be employed.

The above described method is applicable to either of the polyimide resin removing steps prior to and subsequent to the fine particle removing step, and is therefore preferable. It should be noted that, in a case of performing chemical etching after the fine particle removing step, the aperture ratio can be increased by increasing the size of interconnected pores (pores that are formed where the fine particles were adjacent) in the porous polyimide resin film.

On the other hand, as a physical method that can be employed only in the polyimide resin removing step subsequent to the fine particle removing step, a method of: pressure bonding a target surface onto a mount film (for example, a polyester film such as a PET film) being wetted with liquid; drying or not drying; and then peeling the porous polyimide resin film from the mount film can also be employed. Due to liquid surface tension or electrostatic adhesive force, a porous polyimide resin film is torn off from a mount film under conditions in which only the face of the porous polyimide resin film was left on the mount film. In this method, the configuration of the porous polyimide resin film is as illustrated by the schematic diagram of FIG. 5.

[Porous Polyimide Resin Film]

The porous polyimide resin film produced by the above described production method according to the present invention is preferable for having a further increased aperture ratio, and, if employed as a separator in a lithium-ion battery for example, allowing downsizing of the inside of the battery.

The aperture ratio of the porous polyimide resin film can be evaluated by obtaining Gurley permeability for a thickness of 25 µm, in other words the number of seconds required for 100 ml air permeating the film, according to JISP8117.

The Gurley permeability of the porous polyimide resin film of the present invention is preferably no greater than 120 seconds, more preferably no greater than 100 seconds, and most preferably no greater than 80 seconds. Since smaller is better, a lower limit is not particularly defined; however, in consideration of handleability of the porous polyimide resin film, at least 30 seconds. The Gurley permeability of no greater than 120 seconds indicates sufficiently high ion permeability, and the film is preferable for use as a separator in a lithium-ion battery.

[Use of Porous Polyimide Resin Film]

The porous polyimide resin film of the present invention can be used as the separator for a secondary battery, such as a nickel cadmium battery, a nickel hydrogen battery, a lithium ion secondary battery, and a lithium metal secondary battery and is particularly preferably used as the porous separator for a lithium ion secondary battery. Furthermore, the porous polyimide resin film produced by the production method of the present invention can also be used as the separator of a secondary battery, a fuel cell electrolyte film, a film for separating a gas or liquid, or a low dielectric constant material.

[Secondary Battery]

A secondary battery according to the fourth aspect of the present invention is characterized in comprising an electrolytic solution and the separator according to the third aspect being disposed between a negative electrode and a positive electrode.

The secondary battery of the present invention may be of any type and may have any configuration. The present invention can be employed with no particular limitation in known secondary batteries such as nickel cadmium and nickel hydrogen batteries as well as a lithium ion secondary battery, as long as the battery has a configuration in which a battery element including a positive electrode, a separator, and a negative electrode being laminated in this order so as to satisfy the above-described requirements is impregnated with an electrolytic solution and encapsulated in an outer package.

The negative electrode of the secondary battery of the present invention can have a structure in which a negative electrode mixture composed of a negative electrode active material, a conductive auxiliary agent, and a binder is formed on a collector. For example, as the negative electrode active material, cadmium hydroxide can be used in nickel cadmium batteries, and a hydrogen-occlusion alloy can be used in nickel hydrogen batteries. In lithium ion secondary batteries, a material that can be electrochemically doped with lithium can be employed. Examples of such active materials include carbon materials, silicon, aluminum, tin, and Wood's metal.

Examples of the conductive auxiliary agent constituting the negative electrode include carbon materials such as acetylene black and Ketjen black. The binder is composed of an organic polymer, and examples thereof include polyvinylidene fluoride and carboxymethyl cellulose. The collector can be, for example, copper foil, stainless steel foil, or nickel foil.

The positive electrode can have a structure in which a positive electrode mixture composed of a positive electrode active material, a conductive auxiliary agent, and a binder is formed on a collector. For example, the positive electrode active material can be nickel hydroxide in nickel cadmium batteries and can be nickel hydroxide or nickel oxyhydroxide in nickel hydrogen batteries. Meanwhile, in lithium ion secondary batteries, examples of the positive electrode active material include lithium-containing transition metal oxides, specifically, $LiCoO_2$, $LiNiO_2$, $LiMn_{0.5}Ni_{0.5}O_2$, $LiCo_{1/3}Ni_{1/3}Mn_{1/3}O_2$, $LiMn_2O_4$, $LiFePO_4$, $LiCo_{0.5}Ni_{0.5}O_2$, and $LiAl_{0.25}Ni_{0.75}O_2$. Examples of the conductive auxiliary agent include carbon materials such as acetylene black and Ketjen black. The binder is an organic polymer, and examples thereof include polyvinylidene fluoride. The collector can be, for example, aluminum foil, stainless steel foil, or titanium foil.

The electrolytic solution in, for example, a nickel cadmium battery or a nickel hydrogen battery is a potassium hydroxide solution. The electrolytic solution in a lithium ion secondary battery is composed by dissolving a lithium salt in a non-aqueous solvent. Examples of the lithium salt include $LiPF_6$, $LiBF_4$ and $LiClO_4$. Examples of the non-aqueous solvent include propylene carbonate, ethylene carbonate, dimethyl carbonate, diethyl carbonate, ethyl methyl carbonate, g-butyrolactone, and vinylene carbonate. These solvents may be used alone or as a mixture.

Examples of the outer package material include metal cans and aluminum laminate packs. The shape of the battery is, for example, a rectangular shape, a cylindrical shape, or a coin shape; however, the separator of the present invention can be suitably applied to any shape.

EXAMPLES

The present invention will now be more specifically described with reference to Examples, but the scope of the present invention is not limited to the following examples.

In Examples and Comparative Examples, tetracarboxylic dianhydride, diamine, polyamide acid, organic solvent, dispersant, and fine particles described below were used. It should be noted that the varnishes were prepared such that the final solid content concentration was 30% by mass.

Tetracarboxylic dianhydride: pyromellitic dianhydride

Diamine: 4,4'-diaminodiphenylether

Polyamide acid: reaction product of pyromellitic dianhydride with 4,4'-diaminodiphenylether Polyamide imide: polyamide containing trimellitic anhydride and o-tolidine diisocyanate as polymerization components (Mw: approx. 30,000)

Organic solvent (1): blended solvent of N,N-dimethylacetamide and γ-butyrolactone (90:10 in mass ratio)

Organic solvent (2): blended solvent of N-methyl-2-pyrrolidone and N,N-dimethylacetamide (70:30 in mass ratio)

Dispersant: polyoxyethylene secondary alkyl ether dispersant

Fine particles:

Silica (1): silica having an average particle diameter of 700 nm

Silica (2): silica having an average particle diameter of 200 nm

Silica (3): silica having an average particle diameter of 300 nm

[Preparation of Varnish-1]

Polyamide acid solution was obtained by blending 13.25 g of the polyamide acid and 30 g of the organic solvent (1). 75 g of silica (2) as the fine particles was added to the polyamide acid solution thus obtained to prepare a first varnish. It should be noted that a volume ratio of the polyamide acid and the silica (2) in the first varnish was 22:78 (a mass ratio is 15:85).

[Preparation of Varnish-2]

Polyamide acid solution was obtained by blending 13.25 g of the polyamide acid and 30 g of the organic solvent (1). 53 g of silica (1) as the fine particles was added to the polyamide acid solution thus obtained to prepare a second varnish. It should be noted that a volume ratio of the polyamide acid and the silica (1) in the second varnish was 28:72 (a mass ratio is 20:80).

[Formation of Uncalcined Composite Film]

A film of the second varnish was formed on a glass plate with an applicator. An uncalcined composite film having a thickness of 25 μm was produced by pre-baking at 70° C. for 5 minutes. The uncalcined composite film was peeled from the substrate and dried to obtain an uncalcined composite film (1).

[Imidization of Uncalcined Composite Film]

The uncalcined composite film (1) was heated (post-baking) at 320° C. for about 15 minutes, to complete imidization and obtain a polyimide-fine particle composite film (1).

[Formation of Porous Polyimide Film]

The polyimide-fine particle composite film (1) thus obtained was immersed in 10% HF solution for 10 minutes to remove the fine particles contained in the film, washed with water and dried, to obtain a porous polyimide film (1).

[Formation of Two-Layered Uncalcined Composite Film]

A film of the first varnish was formed on a glass plate with an applicator, and then baked at 70° C. for 1 minute, to obtain a first uncalcined composite film of about 2 μm in thickness. Subsequently, a second uncalcined composite film was formed using the second varnish on the first uncalcined composite film and pre-baked at 70° C. for 5 minutes, to obtain a two-layered uncalcined composite film (2) of about 25 μm in total thickness.

[Imidization of Uncalcined Composite Film]

The uncalcined composite film (2) was heated (post-baking) at 320° C. for about 15 minutes, to complete imidization and obtain a polyimide-fine particle composite film (2).

[Formation of Porous Polyimide Film]

The polyimide-fine particle composite film (2) thus obtained was immersed in 10% HF solution for 10 minutes to remove the fine particles contained in the film, washed with water and dried, to obtain a porous polyimide film (2).

Examples 1 to 8, and Comparative Examples 1 to 2

The porous polyimide film (2) thus obtained was subjected to a comparison between different chemical etching conditions, using an aqueous solution of tetraalkylammonium hydroxide (TMAH) or NaOH solution, according to Table 1 below.

[Chemical Etching]

Figure 7:
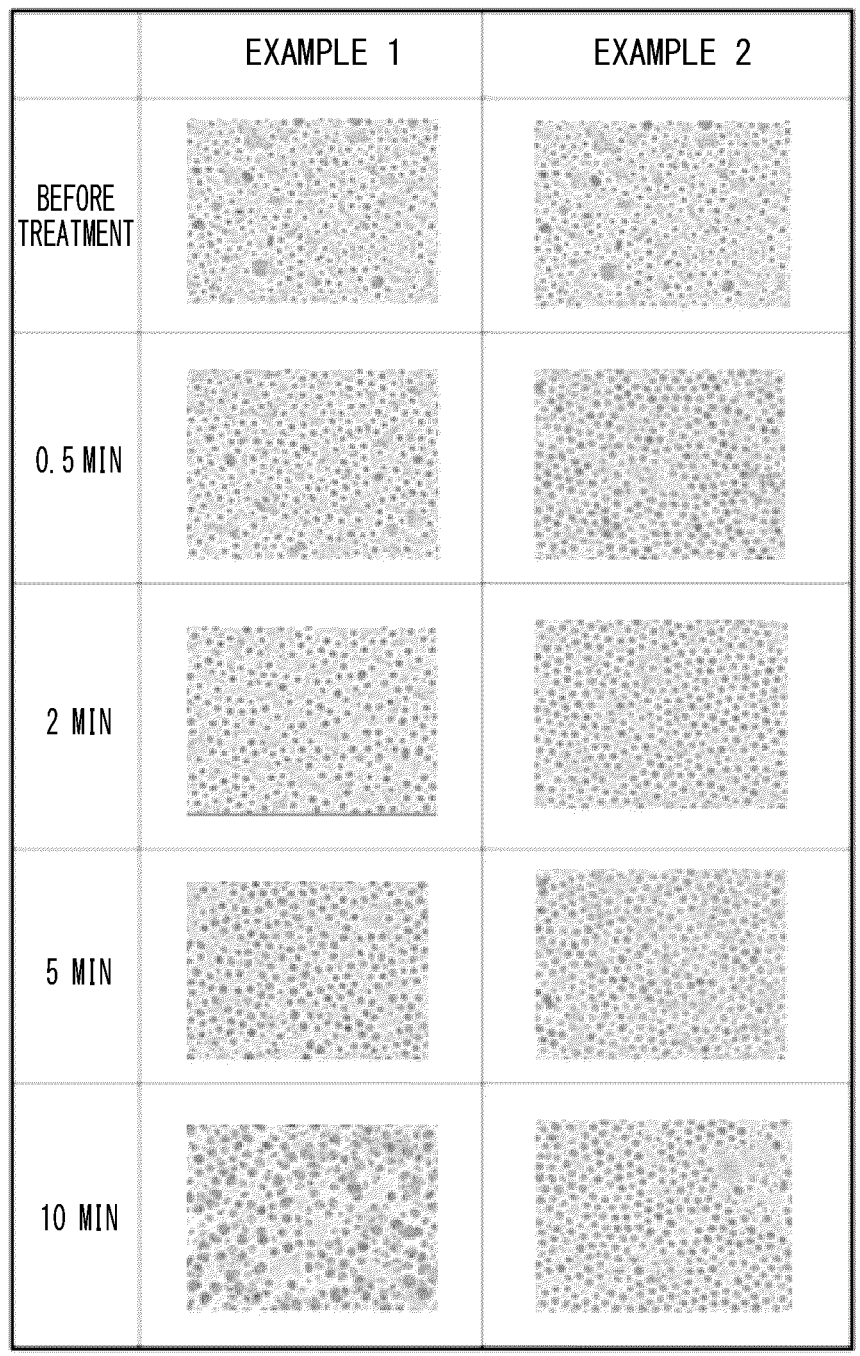
FIG. 7 is a diagram illustrating a surface state of the porous polyimide resin film after the polyimide resin removing step by chemical etching.

Alkaline etching solution was prepared by diluting: 2.38% by mass aqueous solution of TMAH (referred to as "TMAH" in Table 1); or NaOH (referred to as "NaOH" in Table 1) with 50% by mass aqueous solution of methanol, to 1.04%. A part of polyimide was removed by immersing the porous polyimide film in these etching solutions for time periods specified in Table 1. FIG. 7 shows results of observation by SEM of surfaces of the porous polyimide films processed under conditions specified in Table 1.

Examples 9 to 12 and Comparative Examples 3 to 4

[Gurley Permeability]

The porous polyimide films (1) and (2) obtained above were subjected to chemical etching according to Table 1 below, employing the NaOH containing etching solution, which had exhibited, among the results of Examples 1 to 8, superior form change of pores on the surface upon removal of a part of the porous polyimide film; and then samples of 25 μm in thickness were cut therefrom in 5 cm squares. The time for 100 mL of air passing through the sample was measured with a Gurley densometer (manufactured by Toyo Seiki Co., Ltd.) in accordance with JIS P 8117. Results are also shown in Table 1. Results of measurement of thickness by a contact probe meter prior to and subsequent to the chemical etching are also shown in Table 1 as pre-process thicknesses and post-process thicknesses.

TABLE 1

| | Porous Polyimide Film | Etching Solution | Etching Duration (min) | Pre-treatment Film Thickness (μm) | Post-treatment Film Thickness (μm) | Permeation Time (sec) |
|---|---|---|---|---|---|---|
| Comparative Example 1 | (2) | N/A | N/A | | | |
| Example 1 | (2) | TMAH | 0.5 | | | |
| Example 2 | (2) | TMAH | 2 | | | |
| Example 3 | (2) | TMAH | 5 | | | |
| Example 4 | (2) | TMAH | 10 | | | |
| Comparative Example 2 | (2) | N/A | N/A | | | |
| Example 5 | (2) | NaOH | 0.5 | | | |
| Example 6 | (2) | NaOH | 2 | | | |
| Example 7 | (2) | NaOH | 5 | | | |
| Example 8 | (2) | NaOH | 10 | | | |
| Comparative Example 3 | (1) | N/A | N/A | 25.23 | 25.23 | 200 |
| Comparative Example 4 | (2) | N/A | N/A | 25.56 | 25.56 | 170 |
| Example 9 | (2) | NaOH | 0.5 | 25.92 | 25.26 | 100 |
| Example 10 | (2) | NaOH | 2 | 25.58 | 25.02 | 48 |
| Example 11 | (2) | NaOH | 5 | 25.12 | 23.78 | 40 |
| Example 12 | (1) | NaOH | 5 | 25.35 | 24.05. | 45 |

FIG. 7 shows that a part of the porous polyimide film is removed and the pore shape on the surface changes as a result of chemical etching. In addition, the Gurley permeability of the porous polyimide film in Table 1 shows that the time required for 100 ml of air to pass therethrough was substantially reduced as the chemical etching proceeded, and communicability between a foreside and a backside of the porous polyimide film was improved. From a relationship between the permeation time and the thickness change, the improvement in the permeability by the chemical etching is thought to result not only from a reduction in thickness, but also mainly from an increase in aperture ratio.

Example 13

A porous polyimide film was prepared in a similar way to [Preparation of varnish] to [Formation of porous polyimide film] described with respect to the porous polyimide film (2). After the HF treatment, the porous polyimide film washed with water in a wet state was placed on a polyethylene terephthalate (PET) film and baked. Since a surface layer of the porous polyimide film was electrostatically adhered to the PET film, by subsequently peeling the porous polyimide film thus dried from the PET film, only the surface layer remained on the PET film. It should be noted that a face peeled from the PET film is the film formed by the first varnish (a negative electrode side when used as a separator for a lithium-ion battery).

Figure 8:
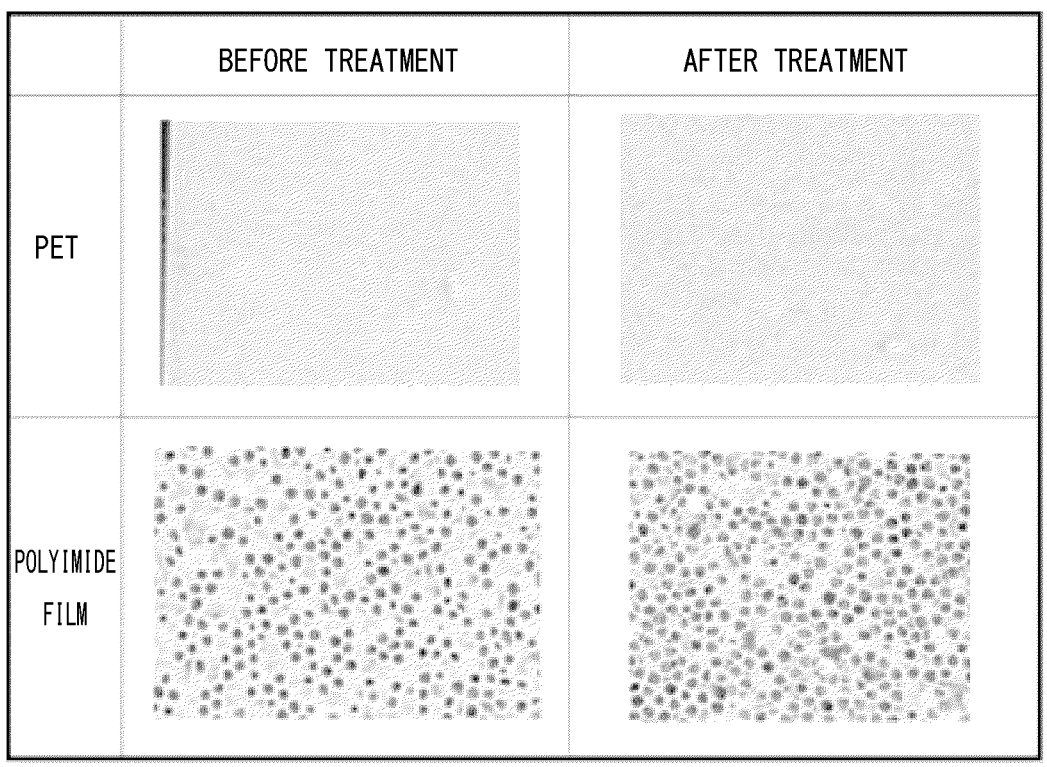
FIG. 8 is a diagram illustrating a surface state of the porous polyimide resin film after the polyimide resin removing step by a physical method.

FIG. 8 shows the surface of the PET film before and after this treatment. The remaining segments of the porous polyimide film surface layer can be observed on the surface of the PET film after the treatment.

On the other hand, comparing the surface of the porous polyimide film before the treatment with the surface of the porous polyimide film after the treatment, it could be confirmed that the surface layer of the porous polyimide film was removed by the above described physical method, and pores were newly exposed to the surface of the porous polyimide film.

Example 14

[Preparation of Varnish-3]

6.5 g of tetracarboxylic dianhydride, 6.7 g of diamine, and 30 g of the organic solvent (1) were put into a separable flask equipped with a stirrer, a stirring blade, a reflux condenser, and a nitrogen gas inlet tube. Nitrogen was introduced into the flask through the nitrogen gas introduction tube and a nitrogen atmosphere was provided in the flask. Subsequently, the tetracarboxylic dianhydride and the diamine were reacted at 50° C. for 20 hours by stirring the contents of the flask to prepare a polyamide acid solution. To the resulting polyamide acid solution, 75 g of silica (3) having an average particle diameter of 300 nm was added such that a volume ratio between the polyamide acid and the fine particles was 22:78 (mass ratio is 15:85), followed by stirring to prepare a first varnish.

[Preparation of Varnish-4]

A second varnish in which a volume ratio is 28:72 (mass ratio is 20:80) was prepared in a similar way to [Preparation of varnish-3], except that 53 g of silica (1) having an average particle diameter of 700 nm was added to the resulting polyamide acid solution.

[Formation of Polyimide-Fine Particle Composite Film]

A film of the first varnish was formed on a glass plate with an applicator, and then baked at 70° C. for 1 minute, to obtain a first uncalcined composite film of about 1 μm in thickness. Subsequently, a second uncalcined composite film was formed using the second varnish on the first uncalcined composite film and pre-baked at 70° C. for 5 minutes, to obtain a two-layered uncalcined composite film (2) of about 20 μm in total thickness.

The uncalcined composite film was peeled off from the substrate, the release agent was then removed with ethanol, and a heat treatment was performed at 320° C. for 15 minutes to complete imidization and obtain a polyimide-fine particle composite film.

[Formation of Porous Polyimide Film]

The polyimide-fine particle composite film was immersed in a 10% HF solution for 10 minutes to remove the fine particles contained in the film.

[Chemical Etching]

Alkaline etching solution was prepared by diluting 2.38% by mass of an aqueous solution of TMAH with 50% by mass of an aqueous solution of methanol, to 1.04%. A part of the polyimide surface was removed by immersing the porous polyimide film in this etching solution. Permeability of the porous polyimide film thus obtained was 63 seconds.

Example 15

A porous polyimide film was formed as in Example 14 except that the varnish was prepared by using a dispersant in an amount of 10 parts by weight based on 100 parts by weight of silica. Permeability of the porous polyimide film thus obtained was 60 seconds.

The film characteristics of the porous polyimide films prepared above were evaluated, and the results are summarized in Table 2. The above described evaluation method for Gurley permeability was used.

[Tensile Strength]

In order to evaluate the strength of a porous polyimide film, the tensile strength of the porous polyimide film was measured. The porous polyimide films of Examples 14 and 15 were each cut into 1 cm×5 cm strip samples. The stress (MPa) at the time when this sample was broken was evaluated with RTC-1210A TENSILON (manufactured by ORIENTEC Co., Ltd.).

TABLE 2

| | Dispersant | Chemical Etching | Film Thickness (μm) | Permeation Time (sec) | Tensile Stress (MPa) |
|---|---|---|---|---|---|
| Example 14 | Absent | Present | 20 | 63 | 7 or higher |
| Example 15 | Present | Present | 20 | 60 | 7 or higher |

Example 15 with the dispersant shows a shorter permeation time than Example 14 without the dispersant, and therefore improvement in interconnectivity between pores. In addition, the strength of the film did not deteriorate even after the chemical etching, and the film had good handleability.

<Production of Coin Battery for Evaluation>

In a coin outer container made of stainless steel and having a diameter of 20 mm, a carbon negative electrode, a separator of Examples 14 and 15 cut into a circle having a diameter of 14 mm, metal lithium cut into a circle having a diameter of 14 mm, and a spacer of copper foil cut into a circle having a diameter of 14 mm and a thickness of 200 mm were stacked in this order; several drops of an electrolytic solution (1 mol·dm$^{-3}$ of LiPF$_6$: a solution mixture of ethylene carbonate/diethyl carbonate=1/1 (volume ratio)) were added to the container so as not to overflow from the container; and the container was capped with a stainless steel cap via polypropylene packing and was sealed with a caulking tool for producing coin batteries to produce a battery for evaluating a separator. Upon production, the separator was used such that a surface thereof with the layer which had been produced by using the first varnish faced the negative electrode. The batteries were used as Examples B1 and B2.

<Evaluation of Charge-Discharge Characteristics of Coin Battery>

The charge-discharge characteristics were evaluated by charging each coin battery for evaluation at a current density of 2.2 mAh (1C) up to 4.1 V (CC-CV operation) and then discharging the battery at a current density of 2.2 mAh (1C) or 3C down to 2.5 V (CC operation), in a thermostatic chamber. Table 3 shows the results. In Table 3, the values shown in parentheses are the electrostatic capacity retention ratios (%) at a rate of 3C when the capacity at 1C is defined as 100%.

<Production of Monolayer Laminate Cell Battery for Evaluation>

A positive electrode of 20 mm×20 mm and a separator of 20 mm×20 mm of the respective above-described Examples were placed in an aluminum laminate outer container in this order, and an electrolytic solution (solvent: ethylene carbonate:ethyl methyl carbonate=3:7, electrolyte salt: 1 mol/l of $LiPF_6$) was added thereto. Furthermore, a negative electrode of 20 mm×20 mm was placed in the container, and the battery case was sealed to obtain lithium ion secondary batteries of Examples B1 and B2. Here, a nickel-cobalt-manganese ternary positive electrode and an artificial graphite negative electrode were used as the electrodes, and arranged such that the surface of the layer formed of the first varnish was in contact with the negative electrode.

Furthermore, monolayer laminate cell batteries were prepared similarly to the above except that a commercially available polyethylene-based (PE-based) or cellulose-based separator was used. These batteries were used as Comparative Examples B1 and B2. The PE-based separator being used had an average pore diameter of 80 nm, a thickness of 20 μm, an air permeability of 270 seconds, and a porosity of 42%; and the cellulose-based separator being used had an average pore diameter of 3000 nm, a thickness of 25 μm, an air permeability of 135 seconds, and a porosity of 70%.

<Charge-Discharge Characteristics of Monolayer Laminate Cell Battery>

Using the resulting lithium ion secondary battery, the potential change by lithium occlusion was measured with a charge-discharge measuring apparatus. The battery was charged up to 4.2 V at a charging speed of 0.2C at 25° C., and after a pause of 10 minutes, was then discharged at a discharging speed of 2C down to a voltage range of 2.7 V. After the discharge, a pause of 10 minutes was taken. The battery was evaluated for the Ah utilization rate and Wh utilization rate (energy retention ratio) during this process. Results are shown in Table 3.

<Heat Resistance of Separator>

The separator used in each battery was evaluated for the heat resistance using a soldering iron of about 250° C. according to the following criteria:

○: When a tip of the soldering iron is pressed against the center of a film, a mark was left, but the film was not broken.

X: When a tip of the soldering iron is pressed against the center of a film, the film was pierced.

<Crushing Test of Monolayer Laminate Cell Battery>

A crushing test was performed by charging a monolayer laminate cell battery at a voltage of 4.2 V and then compressing the battery in a resting state in the direction vertical to the length direction with a round bar having a diameter of 15.8 mm. The time when the voltage reduced was determined as the occurrence of internal short-circuit of the battery, and the battery was evaluated by the pressure at the time of the occurrence of the internal short-circuit. The amount of reduction in voltage 5 seconds after the time of the reduction of the voltage was defined as ΔV (V). A higher value of the pressure is preferred, and a lower reduction in voltage is preferred.

TABLE 3

|  | Separator used | Coin Battery Evaluation Results | | Monolayer Laminate Cell Battery Evaluation Results | | | | |
| --- | --- | --- | --- | --- | --- | --- | --- | --- |
|  |  | 1 C (mAh) | 3 C (mAh) | Ah Utilization Rate (%) vs 0.2 C | Wh Utilization Rate (%) vs 0.2 C | Crushing Test | | |
|  |  |  |  |  |  | Heat Resistance | Pressure (ton) | ΔV (after 5 sec) |
| Example B1 | Example 14 | 2.2 | 1.7 (76.5%) | 88.2 | 84.4 | ○ | 0.57 | 0.26 |
| Example B2 | Example 15 | 2.2 | 1.7 (75.4%) | 88.1 | 84.2 | ○ | — | — |
| Comparative Example B1 | PE | — | — | 83.8 | 78.7 | x | — | — |
| Comparative Example B2 | Cellulose | — | — | 87.6 | 83.9 | ○ | 0.47 | 0.56 |

<Charge-Discharge Characteristics of Monolayer Laminate Cell Battery: Low Temperature and Increase in Charging Speed>

For the lithium ion secondary batteries produced in Example B1 and Comparative Examples B1 and B2, the potential change due to lithium occlusion was measured by using a charge-discharge measuring apparatus. At a temperature of 0° C. and a charging speed of 1C, an Ah efficiency and a capacity retention ratio at a fifth cycle (ratio to the electric discharge capacity at a first cycle) were obtained under conditions of: charging CCCV: 4.2 V; CV: 1 hour; discharge: 2.7 V. Results are shown in Table 4.

<Observation of Negative Electrode Surface after Evaluation of Charge-Discharge Characteristics>

Figure 9:
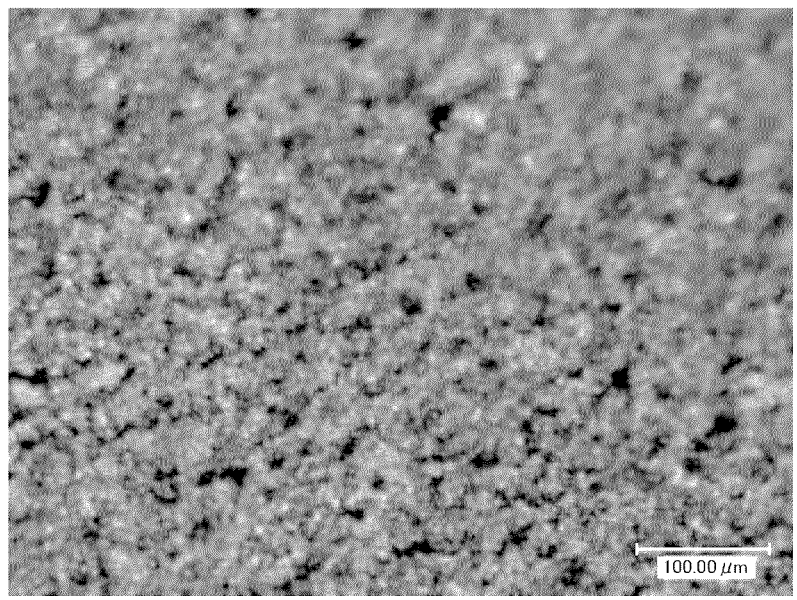
FIG. 9 is a diagram illustrating a negative electrode surface of a secondary battery employing a separator according to the present invention, after a charge/discharge test.
Figure 10:
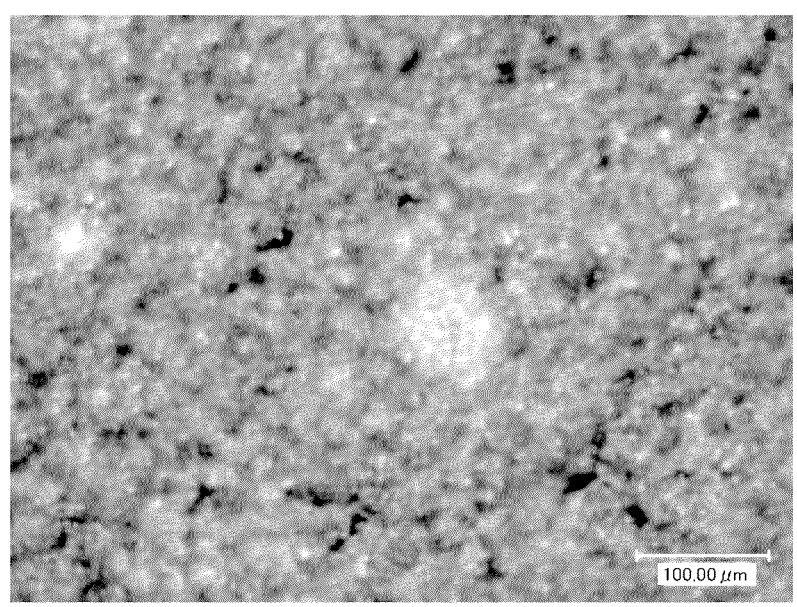
FIG. 10 is a diagram illustrating a negative electrode surface of a secondary battery employing a general-purpose polyethylene (PE) separator, after a charge/discharge test.
Figure 11:
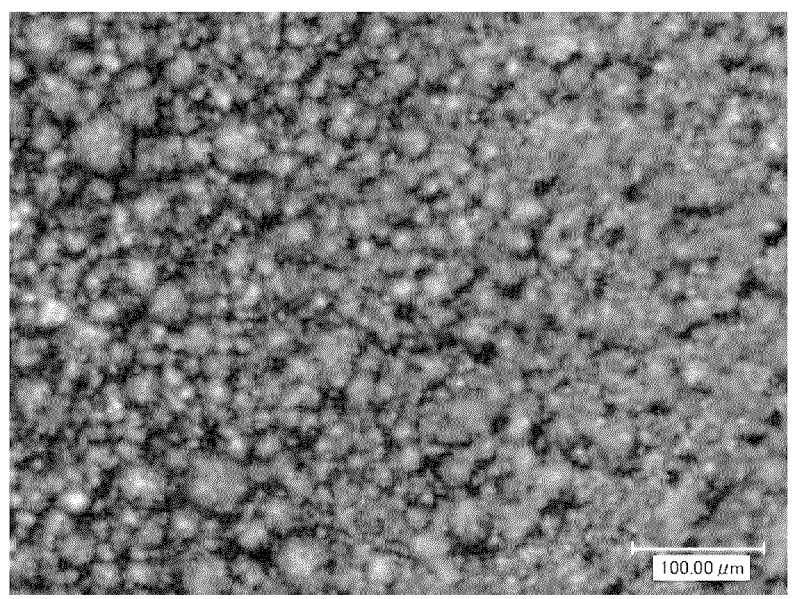
FIG. 11 is a diagram illustrating a negative electrode surface of a secondary battery employing a general-purpose cellulose separator, after a charge/discharge test.

The negative electrode was taken out from the battery after completion of the above described charge-discharge characteristics evaluation test, and a surface thereof was observed. Statuses of dendrite generation on the negative electrode surfaces are shown in Table 4. In addition, the negative electrode surfaces of Example B1, Comparative Example B1 and Comparative Example B2 were enlarged 500 times and observed with an optical microscope. The images are shown in FIGS. 9 to 11.

TABLE 4

|  | Separator used | Monolayer Laminate Cell Battery Evaluation Results | | |
| --- | --- | --- | --- | --- |
|  |  | Ah Efficiency (%) | Capacity Retention Ratio (%) | Lithium Dendrite on Negative Electrode |
| Example B1 | Example 14 | 99.82 | 98.73 | Slight whiteness observed on 4 corners |
| Comparative Example B1 | PE | 95.36 | 77.69 | Whiteness observed in outer periphery |

TABLE 4-continued

| | | Monolayer Laminate Cell Battery Evaluation Results | | |
|---|---|---|---|---|
| | Separator used | Ah Efficiency (%) | Capacity Retention Ratio (%) | Lithium Dendrite on Negative Electrode |
| Comparative Example B2 | Cellulose | 99.68 | 98.63 | Whiteness observed in outer periphery |

Operation of a coin battery and a monolayer laminate cell battery employing the separator of Example of the present invention was confirmed. In addition, it was confirmed that the battery of Example B1 employing the separator of the present invention was superior in heat resistance and performance in the crushing test to Comparative Examples B1 and B2 employing commercially available separators.

FIGS. 9 to 11 are pictures of surfaces of negative electrodes taken out from batteries of Example B1 and Comparative Examples B1 and B2 after completion of the above described charge-discharge characteristics evaluation test. White bright spots due to generation of lithium dendrite were observed on each of these. In the battery of Example B1, there are only a few bright spots on the negative electrode, showing that lithium dendrite generation due to charge and discharge is effectively suppressed. On the contrary, the bright spots on the negative electrodes taken out from Comparative Examples B1 and B2 are large in size and number. In other words, it can be observed that lithium dendrite generation occurs more frequently in Comparative Examples employing commercially available separators based on polyethylene (PE) or cellulose, compared to a case of using the separator of the present invention.

Furthermore, Table 4 and FIGS. 9 to 11 show that the battery employing the separator of Example of the present invention can suppress an amount of lithium dendrite generated on a negative electrode surface and provides a superior capacity retention ratio at low temperature, suggesting that an electrical field applied to the separator is homogenized.

<Observation of Negative Electrode Surface after Evaluation of Charge-Discharge Characteristics>

[Preparation of Varnish-5]

20 g of polyamide imide, 80 g of silica (1) as the fine particles, 0.4 g of dispersant, and the organic solvent (2) were blended and stirred to prepare a varnish (5). It should be noted that a mass ratio of polyamide imide to silica (1) in the varnish (5) was 20:80, and a volume ratio was approximately 28:72.

[Formation of Uncalcined Composite Film]

A film of the varnish (5) was formed on a PET film with an applicator. An uncalcined composite film having a thickness of approximately 28 μm was produced by pre-baking at 100° C. for 5 minutes. The uncalcined composite film was peeled from the substrate and dried to obtain an uncalcined composite film (5), that is a polyamide imide-fine particle composite film (1). From the uncalcined composite film (5) (polyamide imide-fine particle composite film (1)), the solvent had been removed. The uncalcined composite film was not subjected to a calcining step.

[Formation of Porous Polyamide Imide Film]

The polyamide imide-fine particle composite film (1) thus obtained was immersed in 10% HF solution for 10 minutes to remove the fine particles contained in the film, washed with water and dried, to obtain a porous polyamide imide film (1).

Examples 16 to 19

The porous polyamide imide film (1) thus obtained was subjected to a comparison between different chemical etching conditions, using NaOH solutions described below, according to Table 5 below.

Chemical etching solution A: NaOH being diluted with 30% by mass ethanol aqueous solution ($H_2O$:EtOH=70:30) to 1.0% by mass Chemical etching solution B: NaOH being diluted with 30% by mass ethanol aqueous solution ($H_2O$:EtOH=70:30) to 1.5% by mass Chemical etching solution C: NaOH being diluted with 30% by mass isopropanol aqueous solution ($H_2O$:IPOH=70:30) to 1.0% by mass Chemical etching solution D: NaOH being diluted with 30% by mass isopropanol aqueous solution ($H_2O$:IPOH=70:30) to 1.5% by mass

[Chemical Etching]

A part of polyimide was removed by immersing the porous polyamide imide film in the above described etching solutions A to D for 2 minutes (at ambient temperature). Film thicknesses prior to and subsequent to the chemical etching, as well as results of Gurley permeability after the chemical etching (Gurley permeability before the chemical etching for Comparative Example 5) are shown in Table 5.

TABLE 5

| | Etching Solution | Pre-treatment Film Thickness (μm) | Post-treatment Film Thickness (μm) | Gurley permeability (sec) |
|---|---|---|---|---|
| Comparative Example 5 | Absent | 28.0 | — | 135 |
| Example 16 | A | 28.1 | 27.9 | 93.6 |
| Example 17 | B | 28.7 | 27.4 | 87.1 |
| Example 18 | C | 27.6 | 24.9 | 108.3 |
| Example 19 | D | 26.9 | 25.0 | 109.6 |

Table 5 shows that, similarly to the case of the porous polyimide film, even in a case of employing polyamide imide as the polyimide resin, the chemical etching improved Gurley permeability and communicability between a foreside and a backside of the porous polyamide imide film. From a relationship between the permeation time and the thickness change, the improvement in the permeability by the chemical etching is thought to result from not only a reduction in thickness, but also mainly from an increase in aperture ratio as a result of enlargement of openings on the surface and interconnected pores.

EXPLANATION OF REFERENCE NUMERALS

1 Fine particles
2 Polyimide resin portion
3 Pores
4 Porous polyimide resin film

The invention claimed is:
1. A method for producing a porous resin film comprising removing fine particles from a resin-fine particle composite film to thereby obtain a porous resin film, wherein the method comprises removing at least a part of the porous resin film subsequent to removing the fine particles, wherein the removing of at least a part of the porous resin film results in an increase in (i) a pore size of interconnected pores (pores that are formed where the fine particles were adjacent) in an inner portion of the porous resin film and/or (ii) an increase in an aperture ratio of the porous resin film, and the resin is at least one selected from the group consisting of polyimide and polyamide imide.

2. The method for producing a porous resin film according to claim 1, wherein the porous resin film after removing at least a part of the porous resin film is 25 μm in thickness and no greater than 120 seconds in Gurley permeability (JISP8117) with an amount of permeated air being 100 ml.

3. The method for producing a porous resin film according to claim 1, wherein at least a part of the porous resin film is removed by chemical etching or physical removal method, or a combination thereof, and the chemical etching is conducted using an inorganic alkali solution or an organic alkali solution.

4. The method for producing a porous resin film according to claim 3, wherein the fine particles are silica, and at least a part of the porous resin film is removed by chemical etching using an aqueous alcohol solution of an inorganic alkali solution or an organic alkali solution.

5. A method for producing a separator comprising a porous resin film, wherein the method comprises producing the porous resin film by the method according to claim 1; and the resin is at least one selected from the group consisting of polyimide and polyamide imide.

6. A method for producing a secondary battery comprising an electrolytic solution and a separator disposed between a negative electrode and a positive electrode, wherein the method comprises producing the separator by the method according to claim 5.

* * * * *